United States Patent
Scherer et al.

(10) Patent No.: US 11,325,412 B2
(45) Date of Patent: May 10, 2022

(54) SECURITY ELEMENT COMPRISING MICRO-REFLECTORS FOR A PERSPECTIVE REPRESENTATION OF A MOTIF

(71) Applicant: GIESECKE+DEVRIENT CURRENCY TECHNOLOGY GMBH, Munich (DE)

(72) Inventors: Kai Hermann Scherer, Munich (DE); Raphael Dehmel, Neubeuern (DE); Maik Rudolf Johann Scherer, Grainau (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 17/283,419

(22) PCT Filed: Oct. 9, 2019

(86) PCT No.: PCT/EP2019/025337
§ 371 (c)(1),
(2) Date: Apr. 7, 2021

(87) PCT Pub. No.: WO2020/078582
PCT Pub. Date: Apr. 23, 2020

(65) Prior Publication Data
US 2021/0339554 A1    Nov. 4, 2021

(30) Foreign Application Priority Data
Oct. 15, 2018 (DE) .......................... 102018008146.0

(51) Int. Cl.
*B42D 25/324* (2014.01)
*B42D 25/29* (2014.01)

(52) U.S. Cl.
CPC .......... *B42D 25/324* (2014.10); *B42D 25/29* (2014.10)

(58) Field of Classification Search
CPC .................................................... B42D 25/324
See application file for complete search history.

(56) References Cited

U.S. PATENT DOCUMENTS 7,102,823 B2 * 9/2006 Schilling ................ B42D 25/29
                                                            283/94
9,827,802 B2   11/2017 Fuhse et al.
(Continued)

FOREIGN PATENT DOCUMENTS

DE   102010049831 A1    5/2012
DE   102015005969 A1   11/2016
(Continued)

OTHER PUBLICATIONS

International Search Report and Written Opinion from PCT Application No. PCT/EP2019/025337, dated Jan. 28, 2020.
(Continued)

*Primary Examiner* — Kyle R Grabowski
(74) *Attorney, Agent, or Firm* — Workman Nydegger

(57) ABSTRACT

A flat security element with microreflectors arranged as a microreflector pattern in a main plane of the security element. The microreflectors present a motif made up of image points to a viewer. The motif appears for the viewer as lying outside the main plane of the security element. Two of the microreflectors are adjusted in each case to produce one of the image points of the motif appearing for the viewer as lying outside the main plane. The microreflector pattern has several groups of microreflectors. Each of the groups is provided to represent to the viewer a perspective view of the motif after tilting the security element about an axis lying in
(Continued)

the main plane. Image points of the motif are shifted by shift ranges of different sizes through the tilting.

17 Claims, 3 Drawing Sheets

(56) References Cited

U.S. PATENT DOCUMENTS

| | | | | |
|---|---|---|---|---|
| 10,081,213 | B2* | 9/2018 | Fuhse | B42D 25/23 |
| 10,525,758 | B2 | 1/2020 | Fuhse et al. | |
| 10,639,925 | B2 | 5/2020 | Fuhse | |
| 10,870,305 | B2 | 12/2020 | Fuhse et al. | |
| 2006/0097515 | A1* | 5/2006 | Raksha | B44F 7/00 |
| | | | | 283/91 |
| 2006/0198998 | A1* | 9/2006 | Raksha | G02B 27/0025 |
| | | | | 428/323 |
| 2013/0093172 | A1* | 4/2013 | Fuhse | B42D 15/00 |
| | | | | 283/67 |
| 2013/0099474 | A1 | 4/2013 | Fuhse et al. | |
| 2015/0192897 | A1* | 7/2015 | Schilling | B42D 25/355 |
| | | | | 359/2 |
| 2017/0021660 | A1* | 1/2017 | Petiton | B42D 25/328 |
| 2018/0001690 | A1 | 1/2018 | Fuhse et al. | |
| 2018/0117947 | A1* | 5/2018 | Fuhse | B42D 25/324 |
| 2018/0117949 | A1* | 5/2018 | Fuhse | B42D 25/342 |
| 2021/0070088 | A1 | 3/2021 | Fuhse et al. | |

FOREIGN PATENT DOCUMENTS

| | | | |
|---|---|---|---|
| DE | 102017004586 A1 | 11/2018 | |
| EP | 3059093 A1 | 8/2016 | |
| WO | 2011066990 A2 | 6/2011 | |
| WO | 2012000669 A1 | 1/2012 | |
| WO | 2012055538 A2 | 5/2012 | |
| WO | 2015078572 A1 | 6/2015 | |
| WO | 2016180522 A1 | 11/2016 | |
| WO | WO-2016180522 A1 * | 11/2016 | B42D 25/328 |

OTHER PUBLICATIONS

German Search Report from corresponding Application No. 10 2018 008 146.0, dated Jun. 28, 2019.

* cited by examiner

SECURITY ELEMENT COMPRISING MICRO-REFLECTORS FOR A PERSPECTIVE REPRESENTATION OF A MOTIF

BACKGROUND

The invention relates to a security element with microreflectors which is suitable for manufacturing value documents such as banknotes, checks or the like, wherein the microreflectors are structured in such a manner that they present at least one motif made up of image points and appearing in perspective.

Optically variable effects are regularly used in security elements, which are provided for banknotes, passports or cards in particular.

For example, a color shift effect can be achieved by means of color-shifting effect pigments or color-shifting multilayer structures. When changing the viewing angle of the security element, the color shifts (or changes abruptly), for example, from red to green. A (quasi) continuous change in color is already shown by many effect pigments, multilayer structures or diffractive gratings without the need for special adaptation. A color shift is therefore often understood as the more difficult to achieve special case of a color change.

If an image is only visible from one viewing angle and not visible from another viewing angle, it is often referred to as a latent image or a tilt image.

A motif in a security element can be made more difficult to forge by means of more complex motif effects in addition to these two simple optically variable effects (color change or motif change). Examples are moving motifs or motifs with a three-dimensional effect.

In the prior art, it is known to produce motif effects by microreflectors. The microreflectors are formed in a microreflector pattern, so that the flat security element is divided into a multiplicity of pixels, each of which comprises at least one optically effective facet, i.e. at least one microreflector. The flat shape of the security element defines a main plane. A tilt image can be produced, for example, in that only the microreflectors of a partial region are provided with a substantially uniform alignment. The partial region can be recognized by the viewer as a brightly reflecting motif at a viewing angle that is dependent on the common alignment.

In WO 2015/078572 A1, the microreflectors are oriented in such a manner that a motif shows a motif movement effect when the security element is tilted.

In WO 2011/066990 A2, the micromirrors produce a motif with only an apparently bulged surface (motif bulge effect); when the security element is tilted, a brightly reflective point moves on the bulged surface.

A motionless motif that is floating above or below the main plane for the viewer is described in WO 2016/180522 A1 (motif plane effect).

Security features with microreflectors that show such motif effects are difficult to reproduce because they cannot be imitated using conventional printing techniques. At the same time, the motif effects are recognizable to the normal viewer; the microreflectors thus implement a security element that is distinctive.

SUMMARY

It is the object of the invention to so further develop a security feature with microreflectors which are structured in such a manner that they present at least one motif that the recognizable effect is particularly distinctive.

The flat security element has microreflectors and, due to its flat form, specifies a main plane. It is intended in particular for the manufacture of value documents, such as banknotes, checks or the like. The microreflectors are arranged in a microreflector pattern and present to the viewer a motif that lies outside the main plane of the security element. In each case two of the microreflectors are adjusted in order to produce one of the image points of the motif lying outside the main plane for the viewer. The microreflector pattern has several groups of microreflectors which, after tilting the security element about an axis lying in the main plane, each present a perspective view of the motif to the viewer. In the present case, image points of the motif are shifted by differently large shift ranges through the tilting.

The shift range is the length of the distance by which an image point moves in the view when the security element is tilted. The perspective illusion is particularly promoted by assigning its own shift range to each image point of the motif. The shift range and, as will be explained below, optionally also the direction of the shift, is image-point dependent.

With regard to the shift of an image point, there are substantially two degrees of freedom, namely the sign of the shift, referred to here as the shift direction, and the size (in the sense of the amount) of the shift, which is referred to here as the shift range. If the sign of the direction of shift is positive, the image point moves in the same direction in which the security element is tilted. As a rule, this confirms the impression that the motif floats in front of the main plane of the security element. If the sign is negative, the image point moves in the opposite direction to the direction in which the security element is tilted. The impression of a motif that floats behind the main plane is confirmed. The shift range, i.e. the size of the shift, is preferably selected to be proportional to the distance of the image point from the main plane. The distance to the main plane is also referred to as the height at which the image point lies above or below the main plane. Each image point of the motif that is spaced apart from the main plane is produced by (at least) two microreflectors, which are correspondingly adjusted for the two eyes of the viewer. The two microreflectors determine the distance from the main plane at which the image point is arranged for the viewer. A large shift range when tilted amplifies the impression for the viewer that the motif lies clearly outside the main plane.

The motif is preferably a contour line representation. Contour lines can be edge lines of a motif, but also other inner lines, in particular those that serve to represent the motif in perspective. Contour lines are perceptible to the viewer as a single line. They are better suited than flat motifs to be represented as a motif lying outside the main plane with the aid of the micromirrors. Since the contour line is created by the reflection of the micromirrors, it has a high intensity contrast (light-dark) to the—at this viewing angle—non-reflective background. A further particular advantage of the contour line is its relatively small area requirement in the microreflector structure. As a result of the small area requirement, very many groups of microreflectors (one group per view) can be provided in the microreflector structure.

For a particularly good perspective impression, it is preferred that the shift range varies continuously over the motif, in particular along the contour line. The shift range thus continuously decreases or increases over the image points. Correspondingly, motif components can have a continuously decreasing or increasing distance to the main plane. Along the contour line, the shift range changes, in particular, continuously, i.e. not abruptly. The shift range could change linearly, but preferably changes non-linearly along the contour line.

A security element can have two motifs and the shift ranges of the image points of these two motifs can lie in different intervals and/or the shifts can differ with regard to the direction (positive/negative). The shift ranges of the one motif therefore lie in a first interval and the shift ranges of the second motif lie in a different, second interval, or one shift is positive, the other is negative.

The image points of the motif with different ranges will be at different distances to the main plane for the viewer. The different distances are already given in the untilted initial state of the motif. The different distances are retained for the viewer even when tilted by a tilt angle, since the motif is represented in its new perspective view.

Image points that appear to float in front of the main plane when tilted are shifted for the viewer in the same direction as the direction of the tilting movement. Image points that seem to lie behind the main plane when tilted are shifted in the opposite direction to the direction of the tilting movement. The security element is tilted about an axis lying in the main plane. After tilting, a different perspective view of the motif is represented for the viewer by a different one of the groups of microreflectors. In particular for a contour line as a motif, the microreflector structure can be configured in such a manner (nesting) that the viewer can freely select the tilt axis. The security element is thus adapted for tilting about an axis that is freely selectable by the viewer and lies in the main plane. The motif changes its perspective appearance in a conical region around a perpendicular to the main plane.

Of course, a combination is also possible, i.e. motifs that have motif parts with a positive shift direction and motif parts with a negative shift direction. Such a motif then seems to float in sections both below the main plane and above the main plane and thus has transition regions that appear as if they were penetrating the main plane. When the security element is tilted about the axis lying in the main plane, such motifs can be configured in such a manner that they appear to rotate about the main plane when tilted.

For representing the motif, the microreflectors are arranged in the microreflector pattern. As is known, selectable parameters of a microreflector in the microreflector pattern are its position, the azimuthal alignment of the microreflector and the inclination of the microreflector. A curvature, coating and/or structuring of the reflective surface can be employed as further parameters, for example. For example, one (or each) of the directionally reflecting microreflectors can be formed by a planar reflecting area inclined in one direction, an area that is curved, inclined or reflecting in a preferred direction, a reflecting Fresnel structure or a reflecting grating structure.

The microreflector pattern is preferably a regular microreflector grid. The microreflector grid comprises a multiplicity of pixels, each with at least one microreflector. Each pixel preferably comprises several microreflectors, at least 4, preferably more than 8 microreflectors, for example 9 (3×3), 12 (3×4) or 16 (4×4) microreflectors. Pixels of the microreflector grid have their pixel position in the microreflector grid. Within the pixel, the microreflectors are arranged at grid positions. For a group of microreflectors that is assigned to a perspective view of the motif, at least the pixel position is predetermined by the image point of the motif. Conventionally, a grid position in the pixel is also firmly predetermined by a fixed grid position being assigned to the group. In fact, however, the grid position in the pixel can be freely selected. In the present case, microreflectors of a group are arranged at least partially at different grid positions in the microreflector pattern. Instead of the conventional positionally accurate utilization of the grid, a position-variable, in particular position-free or position-oriented (re-employing or multiply occupying), occupation of the grid positions in the pixel is used in the present case.

In preferred configurations, the security element is adapted for a viewing distance of 20-50 cm and/or the contour line has a width of more than 1 mm.

The motif is also preferably at rest overall when tilted. Only optionally can the motif additionally be represented with a rotation or translation—that is uniform for all image points of the motif. An additional translation movement lies preferably perpendicular to the direction of shifting.

As a rule, the tilt angle range is a conical region around a perpendicular to the main axis. This is particularly preferred since the tilting then not only brings about the perspective change effect about a single fixed axis, but any tilting with respect to the perpendicular to the main axis brings about a perspective change. In particular, tilting about crossed axes lying in the main plane brings about the same effect of changing the motif, namely a change in the perspective view. This can also be understood in such a manner that the tilting, which changes the perspective view, can preferably take place about any axis that merely has to lie in the main plane.

Motifs which have a contour line and in which the shift range of the image points varies along the contour line have proven to be particularly readily perceptible. Particularly preferred is an edge line that has a width appearance of more than 1 mm at a viewing distance of 20-50 cm.

In configurations, the contour line, as the motif represented, is point-symmetrical to a center. For each image point, the distance from the center or the distance from a circle around the center is preferably modulated according to a function with which the shift range is also modulated. This approach results in an approximately correct perspective view with little effort. This results in—in particular mandala-like—structures which, with regard to their perspective appearance, bring about a special protection against forgery.

The invention also relates to a value document with a security element of the type mentioned. In one configuration, the value document, for example a banknote, an identification document, a check, an electronically readable card, etc. is configured.

To manufacture the security element, a flat substrate, which defines a main plane due to this shape, is equipped with microreflectors that present at least one motif. The microreflectors are arranged in a microreflector pattern and their alignment is selected such that together they present at least one motif made up of image points and appearing in perspective. The motif changes its perspective appearance when the security element is tilted about an (optionally any) axis lying in the main plane, since the microreflector pattern is formed with several groups of microreflectors. With regard to the alignment of its microreflectors, each group is assigned to a perspective view of the motif, which can be seen at a certain tilt angle. Overall, the motif preferably rests when the security element is tilted. When tilted by a tilt angle, shift ranges of different sizes are assigned to the image points of the object, as already mentioned above. The aspects previously described with reference to the security element also apply analogously to the manufacturing method.

As preparatory steps, the manufacturing method also comprises at least one of the following steps:

producing a contour line representation, in particular by modulating a distance from a motif center or from a circle around a motif center;

determining a microreflector grid, which in particular comprises several microreflectors per pixel; and determining the arrangement of the microreflectors in the microreflector grid.

In the step of determining the arrangement, the required microreflectors are first determined for all image points of the motif. For each image point of the motif in the non-tilted security element, microreflectors are preferably provided circularly around the image point, the outward inclination of which increases with increasing distance and the alignment of which points radially outward. Each microreflector required is determined with regard to its pixel position, for example. The required microreflectors comprise the microreflector pairs, which let the image point appear at a distance from the main plane in the corresponding view. The required microreflectors are then arranged in a position-variable manner, i.e. in particular in a position-oriented or position-free manner, at grid positions in the pixel.

BRIEF DESCRIPTION OF THE DRAWINGS

The invention is explained in more detail below with the aid of embodiment examples with reference to the attached drawings, which likewise disclose features that are essential to the invention. These embodiment examples are merely illustrative and are not to be interpreted as restrictive. For example, a description of an embodiment example with a multiplicity of elements or components should not be interpreted to mean that all of these elements or components are necessary for implementation. Rather, other embodiment examples can also contain alternative elements and components, fewer elements or components or additional elements or components. Elements or components of different embodiment examples can be combined with one another, unless stated otherwise. Modifications and variations, which are described for one of the embodiment examples, can also be applicable to other embodiment examples. To avoid repetitions, the same or mutually corresponding elements in different figures are identified by the same reference numerals and are not explained several times. In the figures there are shown.

DETAILED DESCRIPTION OF VARIOUS EMBODIMENTS

Figure 1:
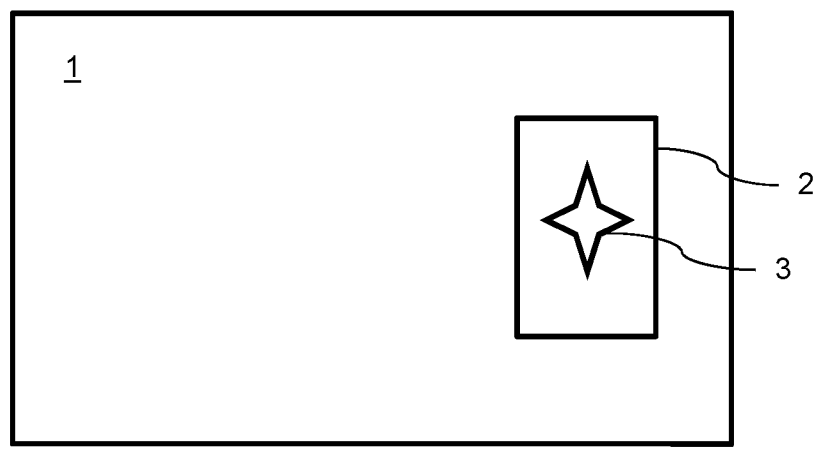
FIG. 1 a plan view of a banknote with a security element.

FIG. 1 schematically shows a banknote 1 with a security element 2. The banknote 1 comprises a printed banknote paper and a security element 1, which in the example was configured as a foil element and applied to the banknote paper. Alternatively, the security element can be completely or partially embedded in the banknote paper. The security element 2 represents in particular a security thread, a tear-open thread, a security band, a security strip, a patch or a label for application to a security paper, value document or the like.

Due to the flat configuration of the security element 1 and of the banknote 2, the security element 2 specifies a main plane which in FIG. 1 coincides with the plane of the drawing.

The security element 2 has a multiplicity of microreflectors which present a contour line motif 3 to the viewer in plan view.

Figure 2:
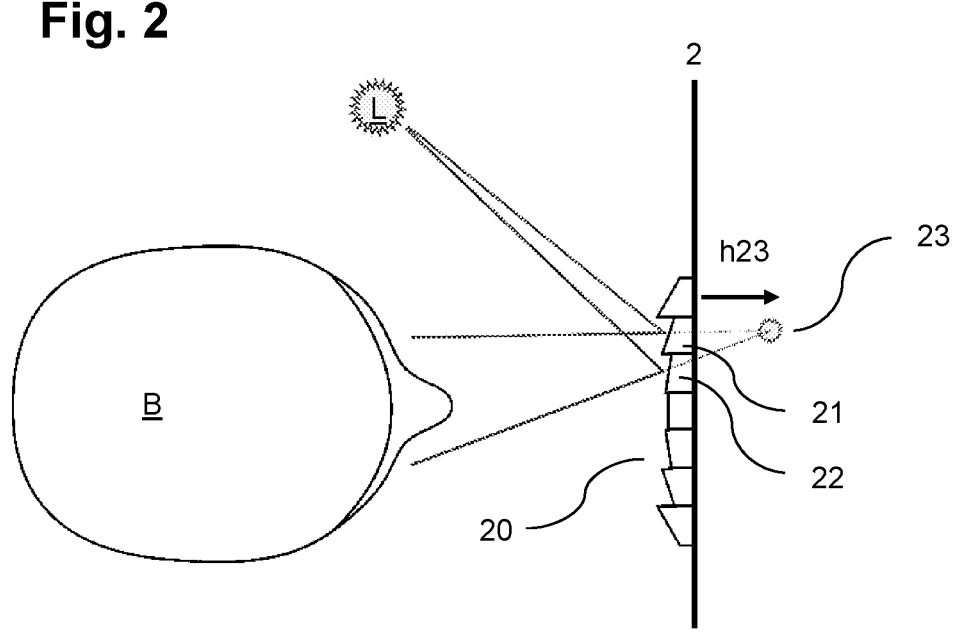
FIG. 2 a schematic representation of the structure of the security element of FIG. 1, FIG. 3 schematically the present behavior of a floating motif when changing the viewing angle, FIG. 4 an example with two contour line representations as motifs in a security element, and FIG. 5 a form of nesting of microreflectors.

FIG. 2 illustrates how a motif of a security element 2 can be represented for a viewer B as floating behind (or possibly in front of) the main plane of the security element 2. The security element 2 has a multiplicity of microreflectors 21, 22 which reflect light in a directed and selective manner towards the viewer. The microreflectors 21, 22 are arranged in a microreflector structure 20. In the figure, only some of the microreflectors are represented in a greatly enlarged, in particular exaggerated manner. In the following, the height of the microreflector structure 20 or of the security element 2 overall is always considered to be negligibly small (approximately zero). The light from a light source L is reflected differently for the two eyes of the viewer B by the microreflector pair—adjusted in inclination and distance—the microreflectors 21, 22. The microreflector pair is adjusted in such a manner that a point 23 of the motif lies for the viewer at a height −h23 behind the security element 2 or its main plane. The motif is formed for the viewer B from a multiplicity of points resulting from reflection, which are linearly arranged along the contour of the motif and at different heights.

Figure 5:
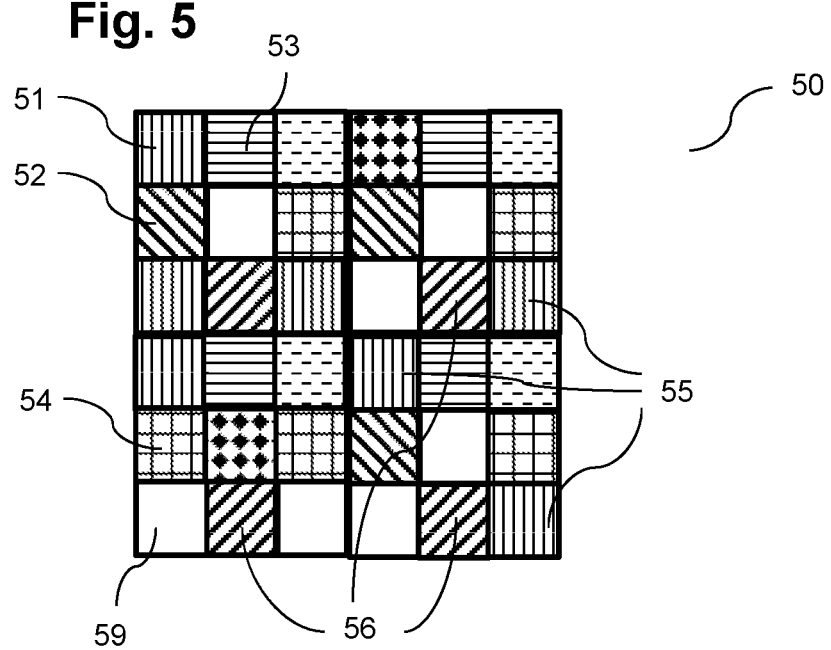

Microreflectors 51, 52, 53 are arranged, as represented in FIG. 5, in a microreflector structure, in particular a microreflector grid 50. The already more complex microreflector grid 50 specifically presented in FIG. 5 will be considered in more detail later. The two microreflectors 21, 22 of a microreflector pair as a rule—deviating from the simplified representation in FIG. 2—do not lie side by side.

As can already be recognized in FIG. 2, the microreflectors of the microreflector structure can additionally be aligned and arranged so that at a different viewing angle a different microreflector pair makes the same point 23 of the motif appear at a different point for the viewer. Such a microreflector structure is also employed in the application WO 2016/180522 A1, wherein a floating curve representation is described as the motif in one of the variants shown. When the security element is tilted, the motif is shifted according to the tilting direction. For the viewer, the shift corresponds to the change in the viewing angle of the floating motif. The floating motif rests for the viewer.

The angle of inclination of neighboring micromirrors (or of those micromirrors contributing to the representation) increases by a constant factor perpendicular to the contour line represented. The factor determines the floating height of the curve representation. For a contour line representation floating at the height h1, all points are thus shifted to the same extent for a new viewing angle. When viewed perpendicularly, the motif appears in its central position. The distance between two positions of a point of the motif by changing the viewing angle is referred to as the shift range. The shift range was thus conventionally the same for all points of the contour line representation as a motif.

Figure 3:
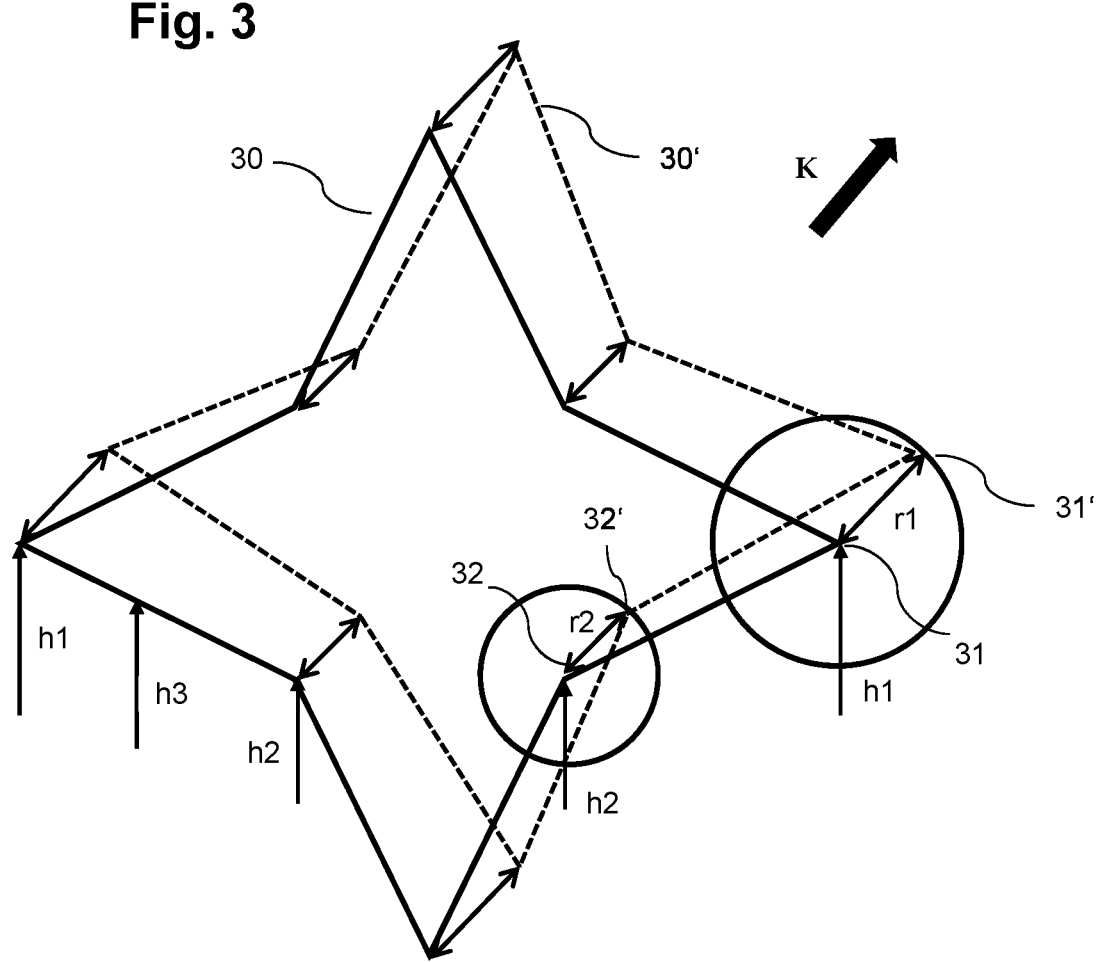

FIG. 3 shows schematically the present behavior of a floating motif 30 when changing the viewing angle. The motif 30 consists of a star-shaped contour line. When viewed perpendicularly, the contour line appears in its central position. The outer corner point 31 of the contour line floats for the viewer at a height h1 above the main plane of the security element. The further outer corner points are at the same height. The inner corner point 32 of the contour line floats for the viewer at a different height h2 above the main plane of the security element, wherein h2<h1 here. The further inner corner points of the star likewise float at the height h2. In the left half of the image it is indicated that further points of the contour line appear to be floating at other heights h3 for the viewer.

If the security element is tilted, as indicated in FIG. 3 by the tilting direction K, the motif shifts inconsistently. The motif 30' represented for the viewer at the new viewing angle is shifted to varying extents with respect to the starting motif 30. The corner point 31 floating at a greater height is shifted more strongly in the tilting direction than the corner point 32 floating at a smaller height. The shift ranges r1 and r2 of the two corner points are different, in particular r1>r2.

For the viewer, the motif 30 is already a motif formed by the contour line that is distinctive and readily perceivable as floating and three-dimensional. The shift ranges of the contour lines are adjusted to the behavior of the three-dimensional, floating motif expected by the viewer. For the viewer, this reinforces the impression of a motif that is floating, three-dimensional—because it is floating at different heights.

In FIG. 3, the circles around the points 31 and 32 each indicate a region to which the points can likewise shift under other tilting directions. The shift ranges r1 and r2 can be viewed as maximum values in this representation. The contour line would no longer be clearly recognizable at larger tilt angles. As many microreflectors as possible (mapped in the main plane) are arranged in the circumference r2 around the point 32 in such a manner that, in pairs, they result in a shift range adjusted to the height h2 and the tilt angle for different tilt axes. As many microreflectors as possible are arranged in the circumference r1 around the point 31, which is mapped on the main plane, in such a manner that, in pairs, they result in a shift range adjusted to the height h1 and the respective tilt angle for different tilt axes. A Fresnel lens-like arrangement of micromirrors for each point to be represented has resulted in an elegant implementation. Micromirrors are provided circularly around a point center, the outward inclination of which increases with increasing distance and the alignment of which points radially outward. The micromirror structure shown in FIG. 2 can be seen as an example of a cross section through such a circular arrangement for a point of the contour line. In a micromirror grid, such micromirror structures of the individual points of the contour line are to be arranged in a manner nested within one another.

A particularly advantageous form of nesting microreflectors will now be described with reference to FIG. 5. FIG. 5 shows micromirrors 51 to 54 which are arranged in a micromirror grid. A pixel in the grid comprises 3 times 3, i.e. 9, micromirrors. As the groups 55, 56 of micromirrors those micromirrors of a contour line representation are considered which represent the motif from a given viewing angle to the viewer. The different parameters of the micromirrors in particular alignment (azimuthal) and inclination (angle of inclination), which together—determine the direction of reflection, as well as surface design, such as curvature or reflectivity, of the reflecting surface are indicated by different hatching of the microreflectors. The micromirror 51 is, for example, a planar reflector with an inclination of 5 degrees and aligned to the right. The planar reflector of the micromirror 52, in contrast, is aligned at 10 degrees to the bottom left (in the figure). Inactive grid points 59 are not hatched and do not have a reflective effect, for example by having a matte surface.

A conventional utilization of the grid would assign exactly one grid position in the pixel to each group 55, 56 of micromirrors. In FIG. 5, the group 55 has the grid position at the bottom right in the pixel. Predetermined by the motif, a microreflector of group 55 is therefore now arranged at the grid position in the two upper pixels and the pixel on the lower right. In contrast, the grid position remains inactive in the lower left pixel of FIG. 5.

This form of utilization can be sufficient for some application cases, such as a motif change between two flat motifs. In contrast to a position-accurate utilization of the grid, a position-free or position-oriented utilization of a grid is used in the present case. As can be recognized in the upper left pixel, several microreflectors 51 of the group 55 can be arranged in one pixel. If a predetermined grid position is utilized pixel by pixel, a form of position-oriented utilization (with multiple occupancy) is present. If, in contrast, any grid positions are utilized pixel by pixel, as with uniformly sequential occupancy—for example first microreflector top left then row by row—a form of position-free (sequential) utilization is present.

The grid position employed in the first pixel (middle row on the left) could be provided for micromirrors 52 of a group. In the pixel lying below, no micromirror is required for the motif of the group of micromirrors 52. Therefore, the grid position is re-employed for the micromirror 54 of a different group, so that a form of position-oriented, re-employing utilization is present.

In the application DE 102017004586, further examples and configuration details of such an optimized utilization of the grid are described in more detail.

In the present case, micromirrors are arranged in a manner nested inside one another and can come both from groups of micromirrors and from different motifs (line representations).

Figure 4:
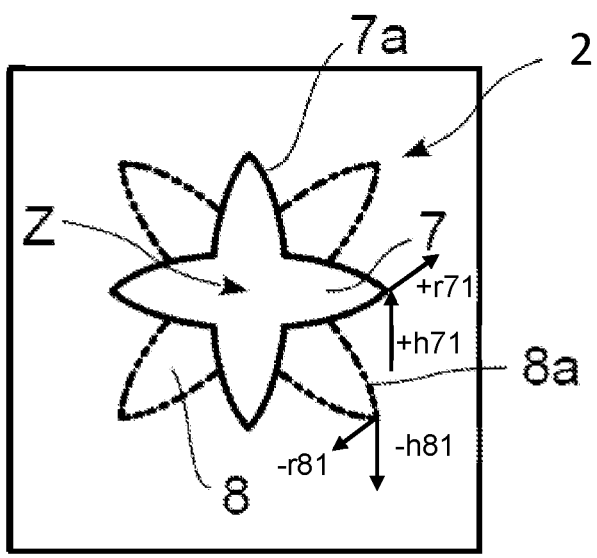

FIG. 4 shows an example with two contour line representations as motifs in a security element 2.

The motifs 7, 8 are each configured in the form of a mandala. The contour line 7a of the motif 7 floats above the main plane. It lies centrally with a first height above the main plane, wherein the height increases nonlinearly towards the outside. A corner point of the contour line lies at a second, greater height +h71 above the main plane. The contour line 8a of the motif 8 floats below the main plane. It is not visible in the center because it is covered by the motif 7. Towards the outside, continues to decrease in a non-linear manner. Correspondingly, a corner point of the contour line 7a lies at a height −h81 below the main plane. In this example, negative height values lie below the main plane, whereas positive height values lie above the main plane. For the viewer, two floating blossoms with a three-dimensional effect are represented, the openings of which are facing away from the main area in different directions. As explained above, the two contour lines 7a and 8a again comprise a multiplicity of image points, which in turn are each produced by at least one microreflector pair. The image point can be seen brightly when the alignment of the corresponding at least two microreflectors is such that illuminating light is reflected to the viewer.

Analogously to FIG. 3, the contour line 7a shifts to varying extents. In particular, the corner point again has the greatest shift range +r71 in the tilting direction when tilting. The second contour line 8a, in contrast, is shifted overall against the tilting direction. The corner point of the contour line 8a experiences the greatest negative shift −r81. In order to produce the desired perspective effect in a particularly distinctive manner when the security element is tilted, the microreflector patterns are formed in such a manner that image points are shifted differently when tilted, although the motif as a whole does not show any movement effect, i.e. substantially rests.

To create the contour lines, a circle was first bent into the mandala shape by periodically modulating the radius with trigonometric functions according to the number of flowers. The shift range along the edge line 7a, 8a is varied such that the flowers of the motif 7 bulge upwards and the flowers of the motif 8 bulge downwards. This is achieved in the embodiment of FIG. 3 in that the shift range was also modulated with the trigonometric function with which the petals were produced from the circle by modulation. This results in a particularly distinctive perspective effect.

The microreflector patterns are configured in such a manner that the perspective change occurs not only when tilted about a certain axis that lies in the main plane H, but that the axis can be freely selected and/or that the same perspective change effect occurs when tilted about two crossed axes.

All of the embodiments of the security element can be implemented as foil elements, as foil elements on window recesses or as a security thread. They can be attached to paper or polymer banknotes on both the front and the back side. The same is applicable to security documents, identity documents, etc.

The invention claimed is:

1. A flat security element with microreflectors, wherein
the microreflectors are arranged as a microreflector pattern in a main plane of the security element,
the microreflectors present a motif made up of image points to a viewer,
the motif lies outside the main plane of the security element for the viewer, in that two of the microreflectors are adjusted in each case in order to produce one of the image points of the motif lying outside the main plane for the viewer,
the microreflector pattern has several groups of microreflectors,
each of the groups is provided in order to represent for the viewer a perspective view of the motif after the security element has been tilted about an axis lying in the main plane,
wherein different image points of the motif are shifted by differently large shift ranges through the tilting, each shift range being defined as the length of the distance by which an image point moves in.

2. The security element according to claim 1, wherein the motif is a contour line representation, wherein the shift range changes continuously along the contour line.

3. The security element according to claim 2, wherein the contour line as the represented motif is point-symmetrical to a center,
wherein the distance from the center or from a circle around the center is modulated according to a function with which the shift range is also modulated.

4. The security element according to claim 1, wherein the security element comprises two motifs,
wherein the shift ranges of the image points of the two motifs lie at different intervals.

5. The security element according to claim 1, wherein the image points of the motif appear for the viewer at a different distance to the main plane.

6. The security element according to claim 1, wherein the image points shift in the same direction as the direction of tilting movement when tilted and the image points appear to float in front of the main plane.

7. The security element according to claim 1, wherein the image points of the motif or image points of a second motif shift in the opposite direction to the direction of the tilting movement when tilted and the image points appear to lie behind the main plane.

8. The security element according to claim 1, wherein the motif changes its perspective appearance in a conical region around a perpendicular to the main plane.

9. The security element according to claim 1, wherein microreflectors of a group in the microreflector pattern are at least partially arranged at different grid positions.

10. The security element according to claim 1, wherein the security element is adapted for a viewing distance of 20-50 cm and/or the contour line has a width of over 1 mm.

11. The security element according to claim 1, wherein the motif has a center and the shift range depends at least in sections on a distance to the center.

12. The security element according to claim 1, wherein the motif as a whole does not show a movement effect when tilted or is represented with a rotation or translation that is uniform for all image points of the motif.

13. A value document with a security element according to claim 1.

14. A manufacturing method for a flat security element, in particular according to claim 1, wherein
a flat substrate that defines a main plane due to this shape is equipped with microreflectors that are arranged in a microreflector pattern and each have an alignment so that they together present at least one motif made up of image points and appearing in perspective, wherein two of the microreflectors are adjusted in each case in order to produce one of the image points of the motif lying outside the main plane for the viewer,
the microreflector pattern is formed with several groups of microreflectors, wherein each group is assigned to a perspective view of the motif with regard to the alignment of their microreflectors, so that when the security element is tilted about an axis lying in the main plane the motif changes its perspective appearance, and
shift ranges of different sizes are assigned to image points of the motif when tilted by a tilt angle.

15. The manufacturing method according to claim 14, wherein the microreflectors of the microreflector pattern for different views are at least partially arranged at different grid positions of a recurring grid in the microreflector pattern.

16. The manufacturing method according to claim 14, wherein the motif is a contour line representation,
wherein the distance of the contour line from a center of the motif or from a circle around the center is modulated according to a function with which the shift range is also modulated.

17. A flat security element with microreflectors, wherein
the microreflectors are arranged as a microreflector pattern in a main plane of the security element,
the microreflectors present a motif made up of image points to a viewer,
the motif lies outside the main plane of the security element for the viewer, in that two of the microreflectors are adjusted in each case in order to produce one of the image points of the motif lying outside the main plane for the viewer,
the microreflector pattern has several groups of microreflectors, each of the groups is provided in order to represent for the viewer a perspective view of the motif after the security element has been tilted about an axis lying in the main plane, wherein different image points of the motif are shifted by differently large shift ranges through the tilting, each shift range being defined as the length of the distance by which an image point moves in, wherein each shift range is proportional to the distance from the main plane to the image point.

* * * * *